T. SHAW.
Table-Casters.
No. 137,248.
Patented March 25, 1873.
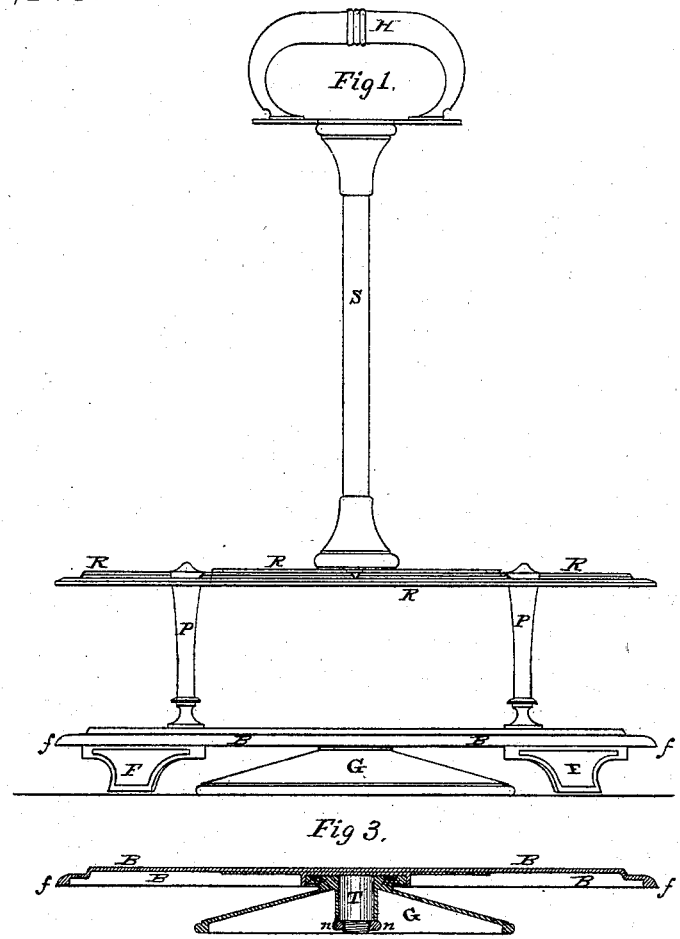
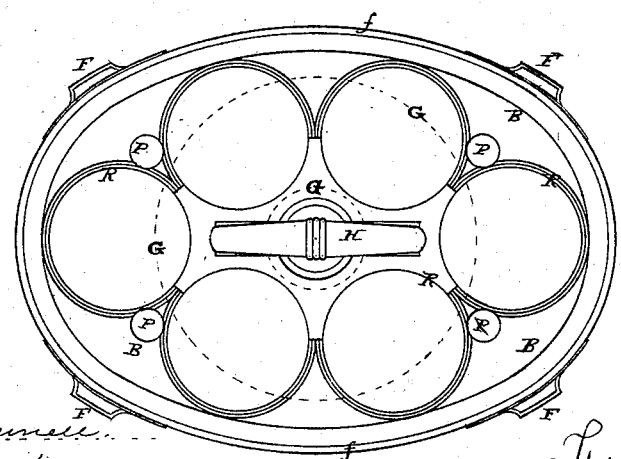
Witnesses,
Inventor,

UNITED STATES PATENT OFFICE.

THOMAS SHAW, OF PROVIDENCE, RHODE ISLAND, ASSIGNOR TO GORHAM MANUFACTURING COMPANY, OF SAME PLACE.

IMPROVEMENT IN TABLE-CASTERS.

Specification forming part of Letters Patent No. 137,248, dated March 25, 1873.

*To all whom it may concern:*

Be it known that I, THOMAS SHAW, of Providence, Rhode Island, have invented a new and useful Improvement in Casters, which is also applicable to some other utensils, of which the following is a specification, referring to the accompanying drawing making part of the same, in which—

Figure 1 is a front elevation of an oval caster with my improvement. Fig. 2 is a plan of the same. Fig. 3 is a vertical section of the caster bottom and the swivel-standard, hereinafter mentioned.

Similar letters indicate like parts in all the figures.

My invention consists in applying a swivel bottom or standard to the bottom or standard of a stationary caster or utensil so that the same shall be capable of rotation horizontally, for the sake of greater convenience in use.

In the accompanying drawing, B is the bottom or standard of an oval caster. R is the bottle-rack; S, the stem; and H, the handle—all united to the bottom B by suitable posts P. The bottles (six in number, usually) are held in the rack R with their bottoms resting on the caster bottom B, which is usually provided with four feet, F, which elevates the bottom plate slightly from the table on which it stands. Such casters are not intended to rotate, but must be lifted to be turned round for reaching a distant bottle or cruet, the chief merit of its construction being that it stands permanently on its bottom or feet, and cannot be easily overturned by accident or otherwise; but if to these desirable advantages the caster was capable of rotation to bring the distant bottle or cruet within reach, the oval caster would combine most of the desirable advantages and conveniences known to articles of its kind. This is accomplished in my invention by attaching a swivel-standard, G, by a center pin or axis, T, to the caster bottom B, as shown in Fig. 3, the swivel-standard, being thick enough to just elevate the feet F, will clear the surface on which it stands, and permits the caster to rotate on the swivel-standard with all the ease of a regular revolving caster; at the same time the close proximity of the feet to the table or surface on which it stands prevents it from being overturned, and the swivel-standard is nearly or quite concealed beneath the broader caster bottom B. The swivel oval caster has all the outward appearance of the ordinary caster or utensil. Besides casters, including those for wine and pickles, the swivel-bottom is obviously applicable to the stationary bottom of fruit, cake, berry, and other stands and articles of table-ware.

The swivel-standard G may be constructed as shown in Fig. 3 or otherwise; but it is important that the bearing which sustains the weight of the structure should be broad and strong, like the top-plate m, against the under side of the caster bottom, and the center-pin T should be of good size and length, and permanently fixed to the caster bottom, and the swivel-stand secured to the bottom by a screw-nut, n, on the center-pin or otherwise, so that the caster will not rock or tilt on the swivel.

The term oval caster herein employed is intended to include all elongated forms of stationary casters with a bottom plate suitable for receiving the concealed or swivel standard beneath it, to enable the structure to be rotated, substantially in the manner shown and described.

When it is desired that the swivel-standard shall be completely concealed the feet F may be omitted, and the edge ƒ of the bottom plate made deeper to nearly the level of the bottom of the swivel-standard so as to clear freely in revolving; or the feet may be retained of less elevation so that there will be but little space between the edge ƒ and the surface on which the structure stands.

*Claim.*

I claim—

The improved oval caster having beneath its bottom or stationary standard B a swivel-standard upon which the caster may rotate, substantially in the manner shown and described.

THOMAS SHAW.

Witnesses:
ISAAC A. BRUMELL,
JOHN F. P. LAWTON.